United States Patent [19]
Preston et al.

[11] Patent Number: 5,787,942
[45] Date of Patent: Aug. 4, 1998

[54] FLOAT-TYPE SHUT OFF DEVICE FOR A CRYOGENIC STORAGE TANK

[75] Inventors: Duane Preston, New Prague; Paul Drube, Apple Valley; Thomas Drube, Lakeville, all of Minn.

[73] Assignee: MVE, Inc., New Prague, Minn.

[21] Appl. No.: 663,798

[22] Filed: Jun. 14, 1996

[51] Int. Cl.[6] .................................................. F16K 21/00
[52] U.S. Cl. ................... 147/198; 141/18; 141/128; 141/212; 141/216; 141/220; 137/427
[58] Field of Search .......................... 141/18, 21, 128, 141/198, 212, 214, 216, 220, 221; 137/427, 433

[56] References Cited

U.S. PATENT DOCUMENTS

| | | | |
|---|---|---|---|
| 1,522,982 | 1/1925 | Strandt | 137/433 |
| 3,929,155 | 12/1975 | Garretson | 141/198 X |
| 4,313,459 | 2/1982 | Mylander | 141/198 X |
| 4,444,230 | 4/1984 | Van Mullen | 141/198 |
| 4,483,367 | 11/1984 | Ross, Jr. et al. | 141/198 X |
| 5,235,999 | 8/1993 | Lindquist et al. | 141/198 X |
| 5,282,496 | 2/1994 | Kerger | 141/18 |
| 5,360,139 | 11/1994 | Goode | 141/18 X |
| 5,411,374 | 5/1995 | Gram | 141/198 X |
| 5,549,142 | 8/1996 | Beale | 141/18 X |

*Primary Examiner*—J. Casimer Jacyna
*Attorney, Agent, or Firm*—Rudnick & Wolfe

[57] ABSTRACT

A snap-action flow interrupt device for terminating flow into a cryogenic storage container utilizes the momentum of the incoming liquid spray as a means of maintaining a float in a submerged position until the proper liquid level is attained. The incoming spray of liquid exerts a downward impact force on a surface of the float. The rising liquid level exerts an upward and increasing buoyant force on the float. When the rising liquid in the tank disrupts the spray, the buoyant force snaps the float upwards to interrupt the flow of liquid. The abrupt motion of the float generates a pressure spike and flow reduction, either of which may be easily detected by automatic fill termination devices or by a human operator.

12 Claims, 5 Drawing Sheets

FLOAT-TYPE SHUT OFF DEVICE FOR A CRYOGENIC STORAGE TANK

BACKGROUND

The invention relates generally to storage and delivery systems for cryogenic fluids. More specifically, the invention relates to a device for abruptly decreasing the incoming flow of liquid cryogen into a storage container when the liquid level in the container reaches a predetermined level. The invention also relates to a cryogenic liquid delivery system incorporating such a device.

As is known, cryogenic liquids are typically stored in thermally insulated tanks which consist of an inner storage vessel mounted within and thermally isolated from an outer shell. Cryogenic liquid is usually dispensed from a bulk supply tank to smaller storage cylinders for use in various applications. Typically, the bulk supply tank is stationary and the storage cylinders are transported to the bulk supply, refilled and transported back to the use site. During the refilling operation, flow of liquid cryogen into the storage cylinder must be terminated at the appropriate time to prevent overfilling, which may result in venting and waste of cryogen. Typically, the storage cylinders are weighed as they are being filled and flow of liquid cryogen is terminated when the appropriate cylinder weight is attained.

The structural reinforcements required to ensure durability of transportable storage cylinders provide additional heat conduction paths and increase the heat inleak to the stored cryogen. In addition, transporting the tanks can be costly. There have thus been recent efforts to utilize stationary storage cylinders, which provide more insulation against heat inleak. These stationary cylinders are refilled from a transportable bulk supply tank, which may be mounted on a truck. Since stationary cylinders are not readily adaptable to fill termination based on weighing, they present certain problems associated with economically providing for accurate fill termination.

Various methods and devices have been used in the past to monitor and control the amount of cryogenic fluid dispensed to a cylinder being filled. For example, the storage cylinder may be placed on a scale and weighed during the filling operation, the flow being terminated when the weight exceeds a predetermined amount. Weighing, however, requires that the cylinder be portable. In cases where the storage cylinder is permanently installed at a distribution facility, weighing is not feasible. Other techniques for sensing a full storage cylinder include the use of a dip tube with one end disposed at the desired fill level and the other end provided with a valve. As the tank is being filled, vapor exits the dip tube. When the liquid level reaches the dip tube, the vapor flow terminates and liquid flow begins. When liquid is sensed in the dip tube, the flow is terminated. Dip tube systems, however, are relatively expensive because remote electronic sensing of the cryogenic liquid in the tube is not possible without sensitive and costly equipment.

Other techniques for controlling the tank-filling operation involve ullage tanks mounted within the storage tank. See for example, U.S. Pat. No. 5,404,918. The ullage tank is provided with one or more small orifices which permit ingress of the cryogenic liquid, but at a much slower rate than the flow rate at which the storage tank is being filled. When the storage tank volume becomes full, an abrupt flow decrease and thus a pressure increase is generated. Liquid flow is terminated. A portion of the liquid then flows gradually into the ullage tank, thereby providing a desired vapor space above the liquid. Inexpensive equipment is sufficient to sense the pressure spike and terminate flow. While ullage tanks permit inexpensive sensing of a properly filled tank, storage tanks incorporating them are costly to manufacture, and are limited to horizontal tanks that are filled at or near empty.

Prior art devices also include a fill termination float 2, as illustrated in FIG. 1. The device incorporates a closed cylindrical float 4 mounted concentrically on an inlet conduit 6. The float is slidably mounted to the conduit and restricted in its vertical movement by lower and upper stops. The float is hollow, containing gas in its interior. Holes 9 are provided in the float for equalizing the pressure therein. As the liquid level in the storage tank rises, the float gradually rises until it obstructs the fill ports 8. The flow of liquid into the tank decreases gradually, and the associated rise in pressure may be monitored by the human operator or an automatic controller to terminate flow. Prior art devices such as this provide only gradual cessation of the incoming flow similar to the shut-off of a toilet, for example. They do not provide a prominent signal that a full level has been achieved. Systems utilizing such a termination device are therefore susceptible to overfilling due to human error. Moreover, automatic systems for sensing the gradual increase in pressure, or decrease in flow, are costly and not as reliable as desired because of the lack of a clear shut-off signal.

It is therefore an object of the invention to provide a fill termination device which addresses the aforementioned shortcomings in the prior art.

SUMMARY OF THE INVENTION

The present invention solves the aforementioned problems by providing a snap-action float device which is subject to the force of the incoming liquid spray as a means of maintaining the float in a submerged position until the proper liquid level is attained. The incoming spray of liquid exerts a downward force on a surface of the float. The rising liquid level exerts a counter, upward and increasing buoyant force on the float. When the rising liquid in the tank encounters the spray header ports, flow from the ports is inhibited and the impact force reduced. The buoyant force then snaps the float upward to markedly reduce the flow of liquid. The abrupt motion of the float generates a pressure spike and flow reduction back through the inlet conduit and may also produce an audible signal. The pressure spike or flow reduction may be easily detected by automatic fill termination devices or by a human operator.

DETAILED DESCRIPTION

Figure 1:
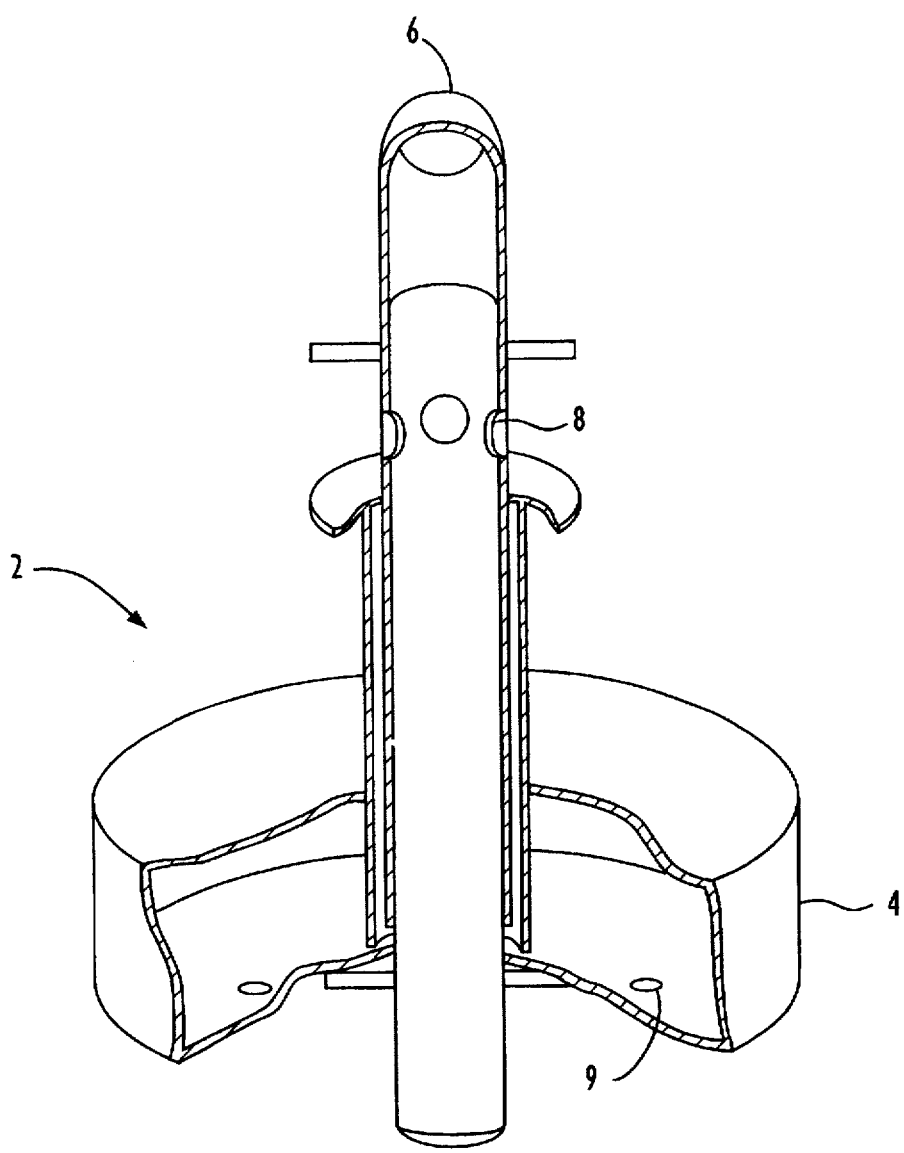
FIG. 1 illustrated a prior art device as explained above.
Figure 2:
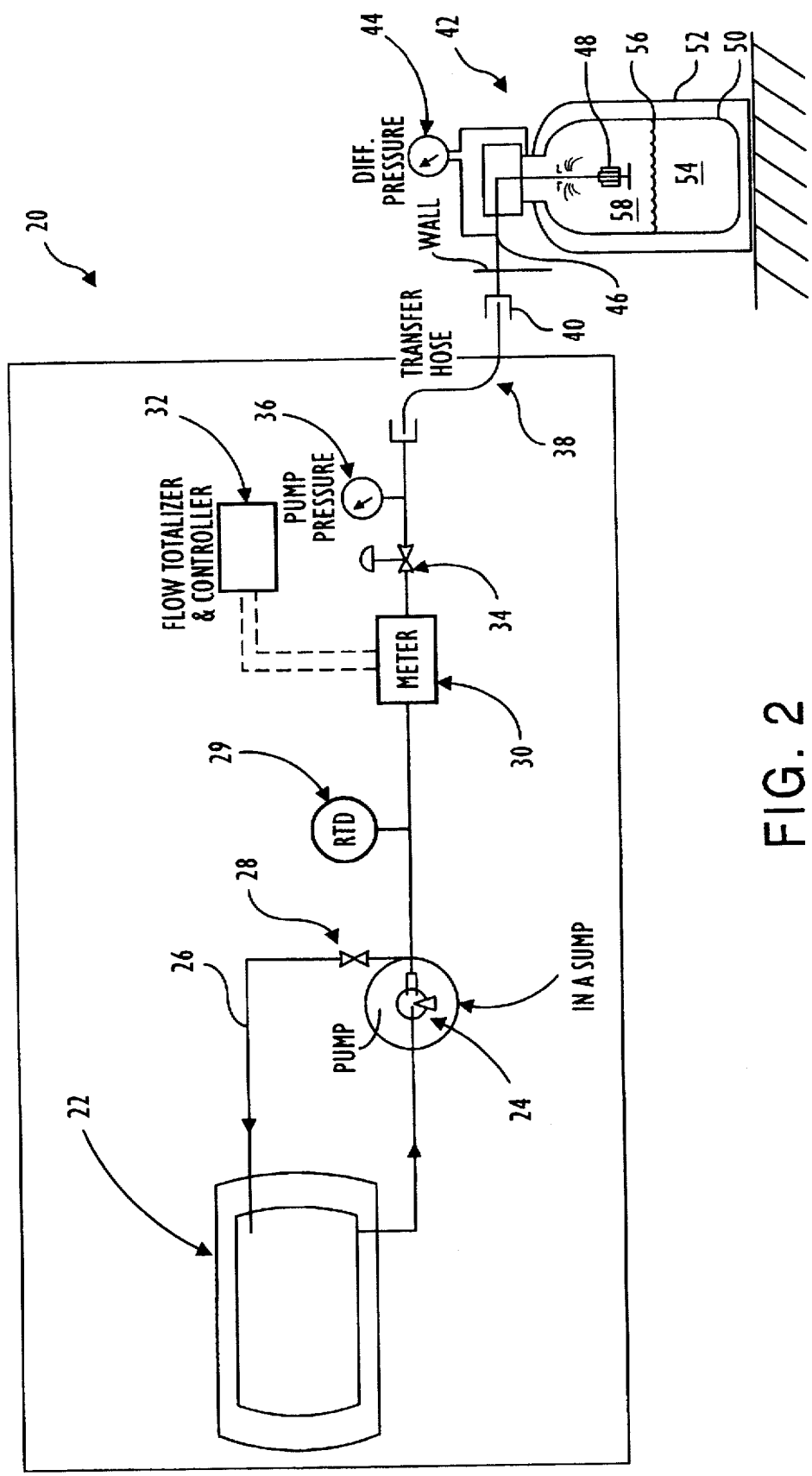
FIG. 2 is a schematic illustrating a fill-termination system in accordance with the invention.

Referring to FIG. 2, there is illustrated a cryogenic dispensing system which incorporates a flow interrupting device according to the present invention. The bulk storage and dispensing system, generally designated 20, may be mounted on a transport truck. It includes bulk storage tank 22, which supplies cryogenic liquid to pump 24. A recirculation conduit 26 and valve 28 are provided to permit cooldown of pump 24 and pressure control within bulk storage tank 22, if required. A temperature device 29 monitors the temperature of the dispensed liquid, for example, to determine the liquid density. Meter 30 is provided at the pump outlet and communicates with a flow totalizer and controller 32 for monitoring and controlling the amount of liquid dispensed. Dispensing valve 34 is disposed downstream of pump 24 and meter 30. A pressure gauge 36 is provided at the outlet of valve 34. A transfer hose 38 is coupled to the storage and dispensing system 20 and is provided with a quick-connect fitting 40 at its distal end for connecting to storage cylinder 42. A differential pressure gauge 44 is provided for sensing the difference between the pressure in cylinder 42 and inlet conduit 46, which conveys liquid cryogen to the interior thereof. A float 48, according to the present invention, is disposed on inlet conduit 46 at a distal end within storage cylinder 42. Storage cylinder 42 includes an inner vessel 50 and an outer shell 52. Liquid cryogen 54 is contained in inner vessel 50 and defines liquid level 56. A vapor space 58 exists above the liquid 54 and provides the pressure head for driving the liquid 54 from cylinder 42 during dispensing. Inlet conduit 46 is provided with a number of spray ports 64 (FIGS. 3 and 4) for dispersing the liquid cryogen about the vapor space above the stored liquid. This has the effect of cooling the vapor space to reduce pressure, thereby permitting the flow of liquid into the tank.

Figure 3:
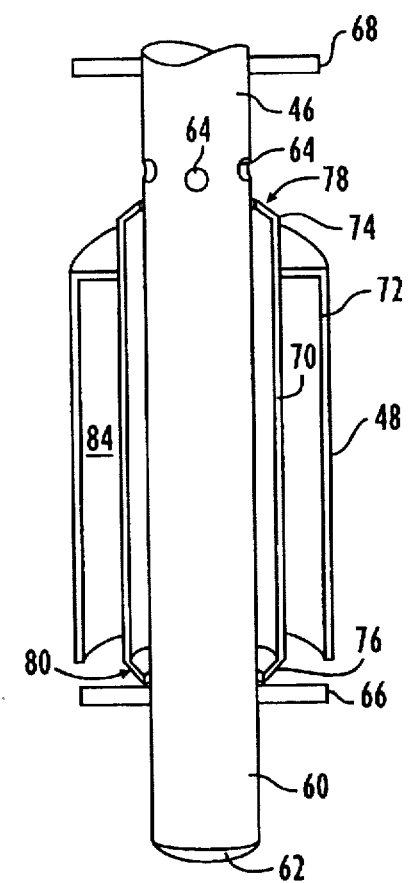
FIG. 3 illustrates in cross-section a float according to the present invention.

FIGS. 3 and 4 illustrate the details of float 48 in accordance with the present invention. The distal end 60 of inlet conduit 46 is provided with a plug 62. A plurality of spray ports 64 are provided above and spaced from plug 62 in conduit 46 for spraying the liquid cryogen into the vapor space. Float 48 is disposed concentrically about conduit 46. Lower stop 66 and upper stop 68, which may each comprise a metal rod through conduit 46, limit the vertical travel of float 48.

Float 48 is provided as a generally cylindrical member having an inner tube 70 and an outer tube 72. Inner tube 70 provides a means for obstructing flow from the ports 64 has an inner diameter which exceeds the outside diameter of inlet conduit 46 to provide a radial clearance passage 71, which permits the flow of liquid therein after float 48 has moved upwards, as will be described. The upper end 74 of inner tube 70 is provided with apron 78 which provides a close fit with the outside diameter of inlet conduit 46. Apron 78, especially its extreme inward portion 79, provides an impact surface against which the incoming liquid exiting through spray ports 64 impinges to exert a downward force on float 48. Outer tube 72 and inner tube 70 define an annular space 84 which contains trapped gas and thereby provides a buoyant force on float 48 as the level of stored liquid cryogen rises. As illustrated, a lower apron 80 may be optionally provided on lower end 76 of inner tube 70 to stabilize float 48 on conduit 46 and to further restrict flow within passage 71. Lower apron 80 may be omitted to reduce manufacturing costs.

Float 48 is preferably constructed from stainless steel for durability and oxygen compatibility. The buoyant force on the submerged float 48 is a function of the amount of liquid displaced by float 48, which depends on the volume defined by annular space 84. Similarly, the impact force exerted on surface 78 may be readily calculated or determined empirically. In accord with the present invention, float 48 is dimensioned such that the buoyant force on the submerged float does not exceed the impact force on the float surface. Those of ordinary skill will understand that the impact surface need not be limited to the swaged surface 78, but may also include other surfaces on the float 48.

Figure 4C:
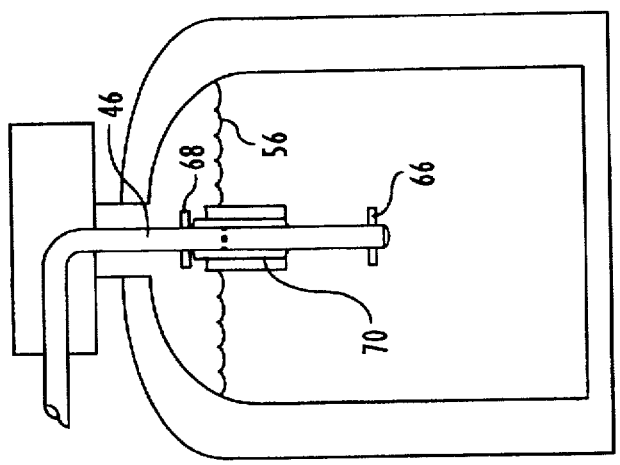
FIGS. 4A-4D illustrate the operation of a shut-off device according to the present invention.
Figure 4B:
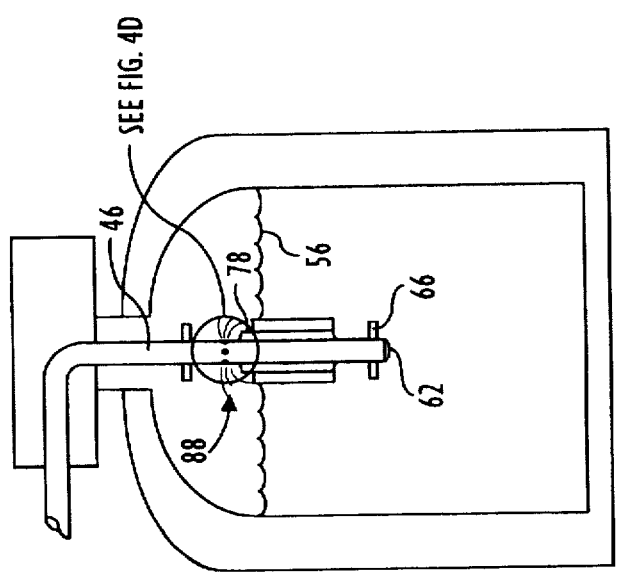
Figure 4A:
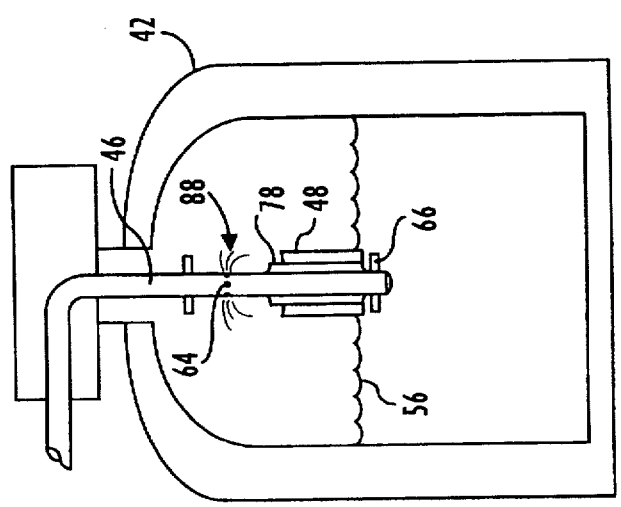
Figure 4D:
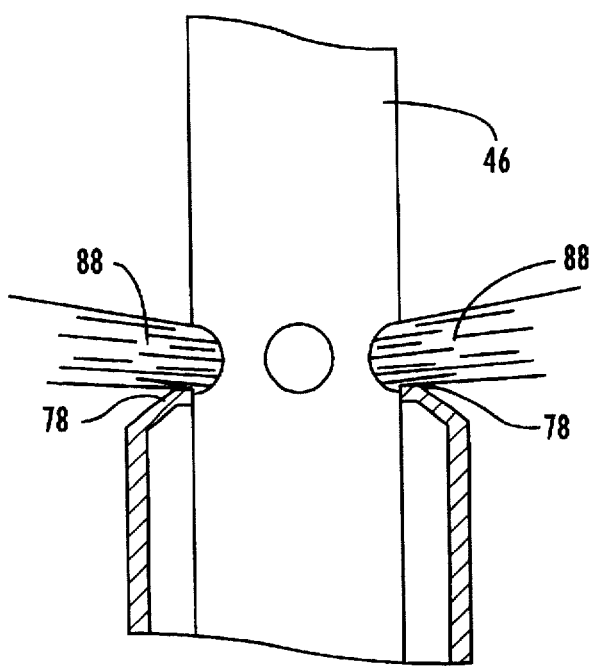

FIGS. 4A–4D depict the operation of the device according to the present invention. Referring to FIG. 4A, float 48 rests on lower stop 66 when the liquid level is beneath the bottom of float 48. Liquid spray 88 enters the storage cylinder 42 through ports 64. When the liquid level 56 reaches the bottom of float 48, the buoyant force begins to act on float 48, causing it to move upwards until apron 78 encounters spray 88, as shown in FIG. 4B. Float 48 is thereafter retained in this position by the impact force of liquid impinging on apron 78 (as shown in detail in FIG. 4D) while the liquid level 56 continues to rise. Nevertheless, the buoyant force continues to increase. The buoyant force will be at its maximum when float 48 is completely submerged in the liquid. As the liquid level 56 continues to rise, it will reach and inhibit spray 88, thereby reducing the impact force on apron 78. When this occurs, the buoyant force is then sufficient to cause the float 48 to move further upwards and snap to the position shown in FIG. 4C, where float 48 abuts upper stop 68. This action is further enhanced by the shape of apron 78, the interior of which is briefly impacted by the spray to cause an upward force. The flow from ports 64 is significantly obstructed by inner tube 70. However, the flow is not entirely occluded and liquid cryogen trickles down through annular passage 71 of inner tube 70.

Referring again to FIG. 2, the resulting flow decrease and pressure impulse experienced in conduit 46 is sensed by either the pressure gage 36 or differential pressure gage 44 or by a flow rate measuring device as desired. In the case of an automatic fill termination sequence, the pressure impulse would be sensed by flow controller 32. In the case of manual fill termination, the operator will note the pressure impulse on gages 36 or 44 or may audibly detect the snap movement of float 48 as it impacts against upper stop 68.

Those of ordinary skill will understand that the foregoing embodiments are meant as exemplary and are not intended to limit the scope of the invention which is defined in the appended claims.

What is claimed is:

1. A flow interrupt device for abruptly decreasing the flow of a liquid cryogen into a storage tank when liquid stored in the tank reaches a predetermined level, the device comprising:
 a) an inlet conduit for conveying cryogenic liquid into the storage tank, the inlet conduit having at least one port for spraying liquid into the tank; and
 b) a float movably mounted concentrically about the conduit for movement between upper and lower positions and including:
  i) a gas compartment to provide buoyancy;
  ii) an impact surface dimensioned to be impinged upon by the spray to maintain the float submerged in the stored liquid until the liquid reaches said at least one port; and
  iii) means for defining a radial clearance passage of reduced volume between said inlet conduit and said float to restrict flow of cryogenic fluid into said tank when the float is in the upper position;
 whereby the force of the spray on the impact surface offsets the buoyant force of the float until the liquid level reaches the at least one port and thereafter the buoyant force causes the float to quickly move to the upper position.

2. The device of claim 1, wherein the float comprises inner and outer cylindrical members which define an annular cavity therebetween, the annular cavity comprising the gas compartment and causing the stored liquid to exert buoyant force on the float.

3. The device of claim 2, wherein the impact surface comprises an apron formed on the upper end of the inner cylindrical member.

4. The device of claim 2, wherein the volume of the annular cavity and the area of the impact surface are selected such that the force of the spray on the impact surface is sufficient to maintain the float submerged until the stored liquid reaches said at least one port.

5. The device of claim 1, further comprising an upper and lower stop member provided on the conduit for defining the upper and lower position.

6. A float for interrupting the flow of cryogenic liquid into a storage container, the container having an inlet conduit with spray ports for dispersing liquid cryogen into the container, the float comprising:
   a) an inner cylindrical member sized to fit concentrically around the inlet conduit to define an annular clearance passage therewith;
   b) an outer cylindrical member disposed concentrically with said inner cylindrical member to define an open annular space therebetween, said annular space containing trapped gas so as to provide a buoyant force on the float as the cryogenic liquid is collected in the storage container; and
   c) an impact surface on the inner cylindrical member for being impinged by spray from the spray ports to create a downward force on the float so that the float is submerged in cryogenic liquid collected in the storage container until the cryogenic liquid collected in the storage container reaches a predetermined level at which time the buoyant force of the float is greater than the downward force exerted upon the float by the spray and, as a result, the float quickly moves to a position where it is interrupting the spray from the spray ports.

7. The float of claim 6, wherein the impact surface is provided on an apron formed on an upper end of the inner cylindrical member.

8. The float of claim 6, wherein the annular space is open at its lower end.

9. A system for filling a storage container with cryogenic liquid comprising:
   a) a transportable bulk storage tank for containing a supply of liquid cryogen and including liquid transfer means for dispensing liquid cryogen therefrom;
   b) means for stopping the flow of liquid cryogen in response to a pressure impulse in the liquid transfer means;
   c) an inlet conduit for conveying liquid from the liquid transfer means into the storage container, the inlet conduit including at least one spray port for spraying the incoming liquid into the storage container; and
   d) a float movably mounted concentrically about the inlet conduit for movement between an upper and lower position and including an impact surface for being impinged by the spray to maintain the float submerged in the stored liquid until the liquid reaches the level of said spray ports; and means for significantly reducing the flow of cryogenic liquid through said port when the float is in the upper position;
   whereby the force of the spray on the impact surface offsets the buoyant force of the float until the liquid level reaches the at least one port and thereafter the buoyant force causes the float to quickly move to the upper position.

10. The device of claim 9, wherein the float comprises inner and outer cylindrical members which define an annular cavity therebetween, the annular cavity comprising a gas chamber causing the stored liquid to exert a buoyant force on the float.

11. The device of claim 10, wherein the impact surface is formed on an upper end of the inner cylindrical member.

12. The device of claim 10, wherein the volume of the annular cavity and the area of the impact surface are selected such that the impact force of the spray on the impact surface is sufficient to maintain the float submerged until the stored liquid reaches the at least one port.

* * * * *